United States Patent
Gluck

(10) Patent No.: US 9,087,364 B1
(45) Date of Patent: Jul. 21, 2015

(54) SYSTEM FOR ENHANCING THE RESTAURANT EXPERIENCE FOR PERSONS WITH FOOD SENSITIVITIES/PREFERENCES

(71) Applicant: Adrian Gluck, Beverly Hills, CA (US)

(72) Inventor: Adrian Gluck, Beverly Hills, CA (US)

( * ) Notice: Subject to any disclaimer, the term of this patent is extended or adjusted under 35 U.S.C. 154(b) by 14 days.

(21) Appl. No.: 14/155,318

(22) Filed: Jan. 14, 2014

(51) Int. Cl.
G06Q 30/00 (2012.01)
G06Q 50/00 (2012.01)
G06Q 50/12 (2012.01)
G06Q 10/10 (2012.01)

(52) U.S. Cl.
CPC ............ *G06Q 50/12* (2013.01); *G06Q 10/10* (2013.01)

(58) Field of Classification Search
None
See application file for complete search history.

(56) References Cited

U.S. PATENT DOCUMENTS

| | | | |
|---|---|---|---|
| 7,953,873 B1 * | 5/2011 | Madurzak | 709/229 |
| 2008/0077455 A1 * | 3/2008 | Gilboa | 705/5 |
| 2011/0318717 A1 * | 12/2011 | Adamowicz | 434/127 |
| 2012/0166232 A1 * | 6/2012 | Neubardt | 705/5 |

OTHER PUBLICATIONS

NPL_Marilyns_Bakery, Marilyn's Bakery: A Unique Homemade Tradition, website downloaded from https://web.archive.org/web/20111101001258/http://www.marilynsbakery.com/index.shtml on Apr. 4, 2014, 1 page dated Nov. 1, 2011.*

* cited by examiner

*Primary Examiner* — Paul Danneman
(74) *Attorney, Agent, or Firm* — Smyrski Law Group, A P.C.

(57) ABSTRACT

A method and apparatus for providing food to a patron, such as a restaurant patron, is provided. The method includes receiving a set of food sensitivity and preference query responses from the patron, employing the computing device to evaluate a proposed target restaurant set of dish offerings, or menu, in view of the set of food sensitivity and preference query responses and determine a patron specific menu based on the proposed target restaurant set of dish offerings and the set of food sensitivity and preference query responses, and providing the patron specific menu to the patron based on the evaluation and determination.

20 Claims, 4 Drawing Sheets

SYSTEM FOR ENHANCING THE RESTAURANT EXPERIENCE FOR PERSONS WITH FOOD SENSITIVITIES/PREFERENCES

BACKGROUND OF THE INVENTION

1. Field of the Invention

The present invention relates to dining out, and more particularly to providing a pleasant dining out experience for persons having food sensitivities or preferences.

2. Description of the Related Art

Everybody enjoys going out to a restaurant to enjoy a meal. However, many people suffer from food sensitivities (food intolerances or food allergies), and both the patrons and restaurant personnel seek to minimize issues with such sensitivities. A typical person having food sensitivities may have a great interest in restaurant offerings and may ask how certain dishes are prepared, and wait staff may or may not know depending on the particular dish and/or sensitivity. Restaurant personnel certainly seek to serve patrons food they desire, but servers may simply not know of the contents of all ingredients of a particular dish. In an absolute worst case scenario, a patron with multiple sensitivities may be faced with just two, one, or even no choices from a full restaurant menu. A patron may peruse an extensive menu for several minutes, ask the wait staff certain questions, wait for the wait staff to investigate certain food sensitivity issues, and finally conclude that nothing on the menu she can eat appeals to her.

Certain patrons may request preparation alterations—no gluten, no peanut oil, no trans fats, no butter, no shellfish, etc. In the views of a chef preparing the dish, such alterations may compromise the quality of the dish and may not provide the requisite dining experience commensurate with the standards of the establishment. Further, making a different dish on the fly, omitting certain components, may place a significant additional burden on the food preparation staff.

Certain patrons may additionally have certain preferences, including a desire not to eat meat, a desire to avoid salt, a desire to eat kosher products, and so forth. Such persons may be looking for a restaurant that does not, for example, serve meat, and may consider a restaurant that advertises vegetarian meals but changes menus on a daily basis, and on the day he wishes to visit, the restaurant offers only one vegetarian dish that he dislikes.

Additionally, once the wait staff understands the specific preferences of the patron, these preferences must be captured by the wait staff and given to the kitchen staff accurately in order to minimize dishes that need to be redone.

Thus in the face of patrons having food sensitivity issues or certain preferences, certain time and restaurant revenues may be lost based on the way such sensitivity and preference issues are currently addressed.

Therefore, it would be desirable to provide a system that addresses previous issues related to restaurant patrons having food sensitivities or preferences. Such a system would preferably decrease costs incurred by restaurant personnel addressing individual food sensitivities or preferences and time required to provide such patrons with satisfactory meals, and increase revenues by providing more choices to more patrons with food sensitivities or preferences.

SUMMARY OF THE INVENTION

According to one aspect of the present design, there is provided a method for providing food to a patron, such as a restaurant patron. The method includes providing, from a computing device, a set of food sensitivity and preference queries to the patron and receiving at the computing device a set of food sensitivity and preference query responses from the patron. When the patron displays an intent to patronize a participating restaurant, the method further includes employing the computing device to evaluate a current menu and possible alterations to the menu in view of the set of food sensitivity and preference query responses and determine a patron specific menu based on the current menu and possible alterations to the current menu and the set of food sensitivity and preference query responses, and providing the patron specific menu to the patron.

According to another aspect of the present design, there is provided an apparatus for facilitating providing food to a patron, comprising a computing device. The computing device includes a patron database configured to receive and maintain at least one set of patron food sensitivity and preference query responses representing food sensitivities and preferences indicated by a restaurant patron, a restaurant database configured to maintain participating restaurant information, a foods database configured to maintain a series of foods compatible with patron sensitivities and preferences and a series of foods incompatible with patron sensitivities and preferences; and a decision engine configured to receive information from the patron database, restaurant database, and foods database and determine a patron specific menu based on at least one set of patron food preference query responses, participating restaurant information, and the series of foods compatible with patron sensitivities and preferences and the series of foods incompatible with patron sensitivities and preferences.

In accordance with another aspect of the present design, there is provided a method for providing food to a patron. The method includes receiving a set of food preference query responses from the patron, employing the computing device to evaluate a proposed target restaurant set of current menu dish offerings and offerings that can be specially created for the patron in view of the set of food sensitivity and preference query responses and determine a patron specific menu based on the proposed target restaurant set of dish offerings and the set of food sensitivity and preference query responses, and providing the patron specific menu to the patron based on the evaluation and determination.

These and other advantages of the present invention will become apparent to those skilled in the art from the following detailed description of the invention and the accompanying drawings.

BRIEF DESCRIPTION OF THE DRAWINGS

For a more complete understanding of the present disclosure, reference is now made to the following figures, wherein like reference numbers refer to similar items throughout the figures.

The exemplification set out herein illustrates particular embodiments, and such exemplification is not intended to be construed as limiting in any manner.

DETAILED DESCRIPTION OF THE INVENTION

The following description and the drawings illustrate specific embodiments sufficiently to enable those skilled in the art to make and use the structure described. Other embodiments may incorporate structural and other changes. Examples merely typify possible variations. Portions and features of some embodiments may be included in or substituted for those of others.

The present design includes a system and methods for maintaining food sensitivities and preferences for particular patrons in a central location, coordinating with restaurants to convey food sensitivities and preferences of individual patrons, and potentially providing a personalized menu to a patron when the patron visits a participating restaurant.

Although the word "restaurant" is used frequently herein, it is to be understood that the word "restaurant" is intended broadly to mean any type of food service establishment including but not limited to grocery stores, cafeterias, mess halls, commissaries, and food trucks. Further, the present design employs terminology such as "sensitivity"/"sensitivities," "allergy"/"allergies," "preference(s)" and so forth. As used herein, an "allergy" is generally intended to indicate an adverse reaction to a food product, where a food "sensitivity" is broader and includes both food allergies and food intolerances. The word "preference" with respect to food or food components is intended herein to indicate any type of food desire that is not food sensitivity based. However, these words are intended broadly, as certain persons may consider a food preference to be a sensitivity when such is not the case, and a food allergy may be perceived as a food intolerance in certain circumstances. Use of these words shall not limit the scope of the invention.

Figure 1:
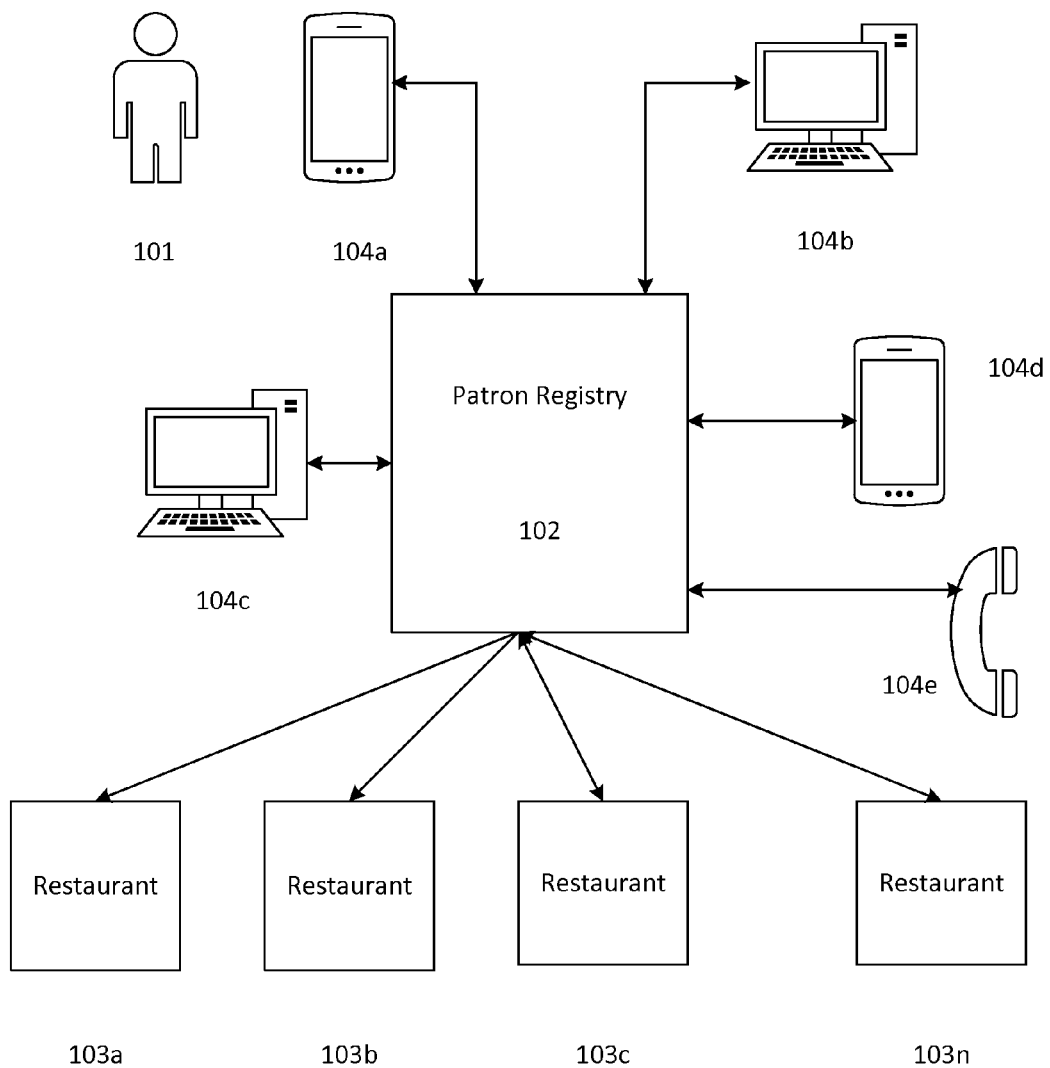
FIG. 1 illustrates an implementation of the present design.

FIG. 1 discloses a general arrangement for the present design. According to FIG. 1, the patron 101 may provide information in a variety of ways, including by mail, telephone, or using a computing device such as a personal computer, tablet, smart phone, or other similar device. The information is provided to a central location, here called a patron registry 102. The patron registry 102 may provide patron information to one or more participating restaurants 103a-n. The patron 101 may then make a reservation with one of the restaurants, such as restaurant 103b, for a particular date and time. When patron 101 visits restaurant 103b at the appointed time, she may receive a menu specifically printed for her including food items satisfying her previously submitted sensitivities, preferences, and/or requests. Alternately, she may search for restaurants in her area that are participants in the system and may make a reservation based on such information.

A variety of devices 104a-104e are shown connected to patron registry 102, which may be a collection of servers, a single server, the Internet cloud, or any collection of devices that effectuates the functionality disclosed herein. Patron registry 102 may further include telephone and other communication receiving functionality.

Figure 2:
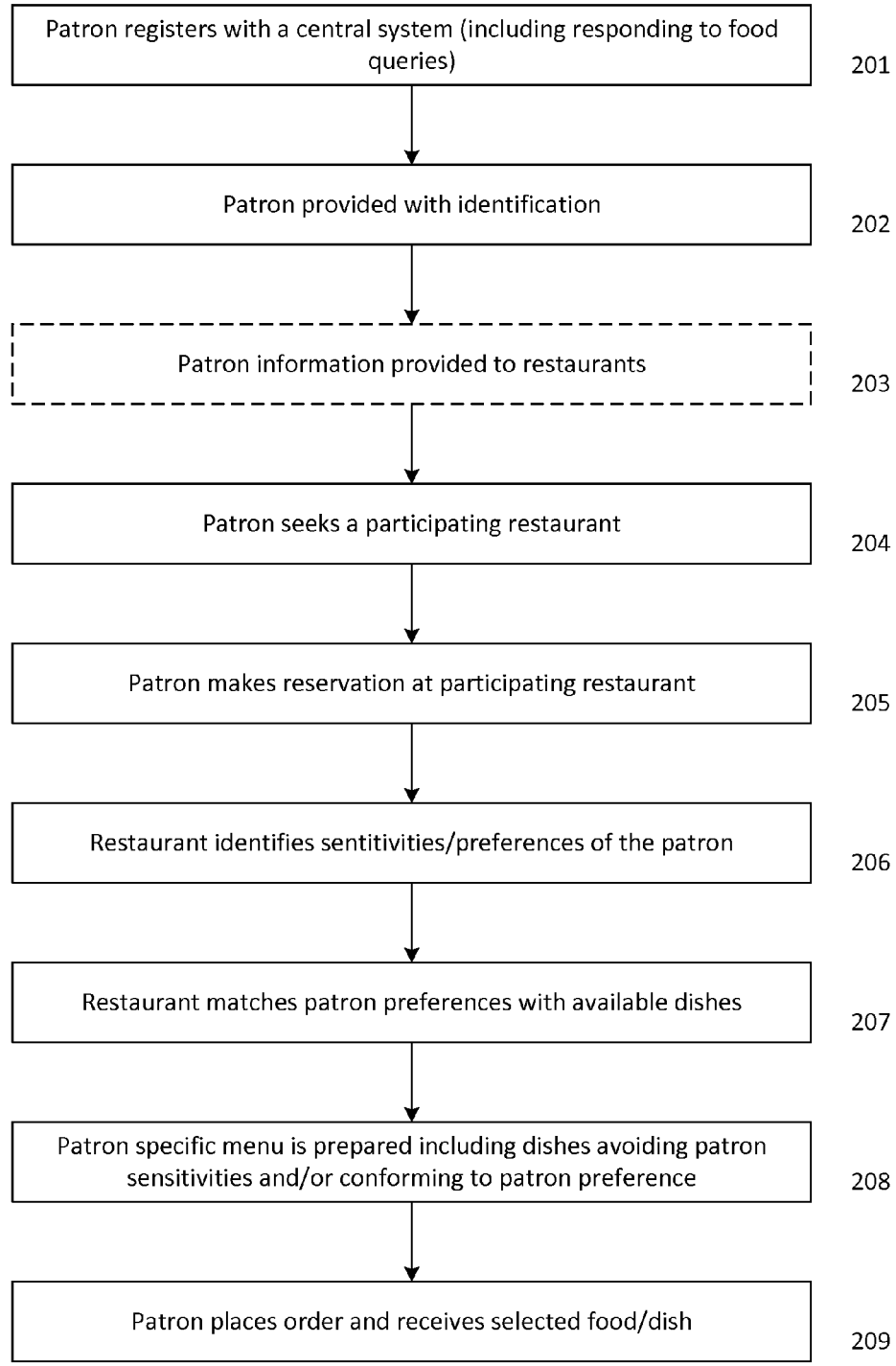
FIG. 2 is a flowchart of one aspect of the present design.

A general flowchart of one embodiment of the design is provided in FIG. 2. From FIG. 2, the user or patron registers with a central system, such as patron registry 102, at point 201. The individual provides his name and indicates any type of desired food sensitivity or preference. While in certain situations a patron may have an allergy and in worst case situations may die if exposed to certain foods, the same patron or another patron may simply prefer use of olive oil over butter, for example, and may express this as a preference. Certain levels of sensitivity (allergy or intolerance) may be provided, such as extreme, moderate, and slight, or graded on a scale such as one to ten. A patron who will become extremely ill if served shellfish may indicate a strong preference for no shellfish, while her sensitivity to margarine may be lower in sensitivity level. The patron may be guided in this regard, i.e. provided with instructions such as "Please identify foods or ingredients that MUST NOT be included in your meal" or "Please select all foods to which you have an allergy or are intolerant" or "Please identify preferred food or ingredients" or "Please identify foods and ingredients you would prefer omitted from your meal."

At point 202, the patron may be provided with an identification in the form of a number, card, or other identifier. The patron registry 102 may then provide the information to restaurants at point 203, but this is not absolutely required. At point 204, the patron may search for a participating restaurant, and at point 205, the patron may make a reservation, providing the establishment with his identifier or identification provided at point 202. At point 206, the restaurant identifies the sensitivity or sensitivities of the patron, as well as his priorities, preferences, and so forth.

The restaurant may employ computational functionality, such as a computing device, that determines appropriate foods for the patron, and such a computing device may match information based on the requirements, sensitivities (allergies, intolerances) and preferences of the patron. For example, if the patron eats fish but does not wish to have peppers, is it acceptable for the dish to be prepared without peppers, or alternatives if peppers are not employed? In another instance, the computing device may determine that shallots are not desired by the patron, but he would not have an issue with peanuts, and the dish may be made with peanuts rather than shallots. Such functionality is typically provided by a computing device, but may at least in part be guided by the restaurant personnel. Thus at point 207, the restaurant matches patron sensitivities and preferences with dishes, including identifying dishes that may not be served to this patron, dishes that can unequivocally be served to the patron, and dishes that may be served to the patron depending on his or her wishes for that meal.

The restaurant may use this information in different ways depending on the restaurant. If a number of patrons preferring to avoid meat are expected on Tuesday, the restaurant may minimize its meat purchases on Tuesday morning. Menus may be prepared for the entirety of expected restaurant patrons, certain groups of patrons, or even individual patrons. As an example, a patron may desire no meat and no peanuts. When she makes a reservation at a participating establishment, the establishment finds her requirements and preferences based on her identification and determines meals that may be prepared for her—a substitution of walnuts may be acceptable for a dish normally requiring peanuts, and tofu may be employed in certain dishes normally served with meat. As a result, the patron upon visiting the establishment may be presented with a menu specifically determined for her. For a person with no set preferences or restrictions, the establishment might offer 40 choices; for this particular patron, the establishment may offer 25 choices. Fewer questions are required, and the selected meal can be prepared.

Point 208 indicates the preparation of specific menus including a subset of available dishes for at least one person with established preferences, sensitivities, and/or restrictions. Point 209 indicates the patron places her order and the food is prepared and delivered to the patron.

Figure 3A:
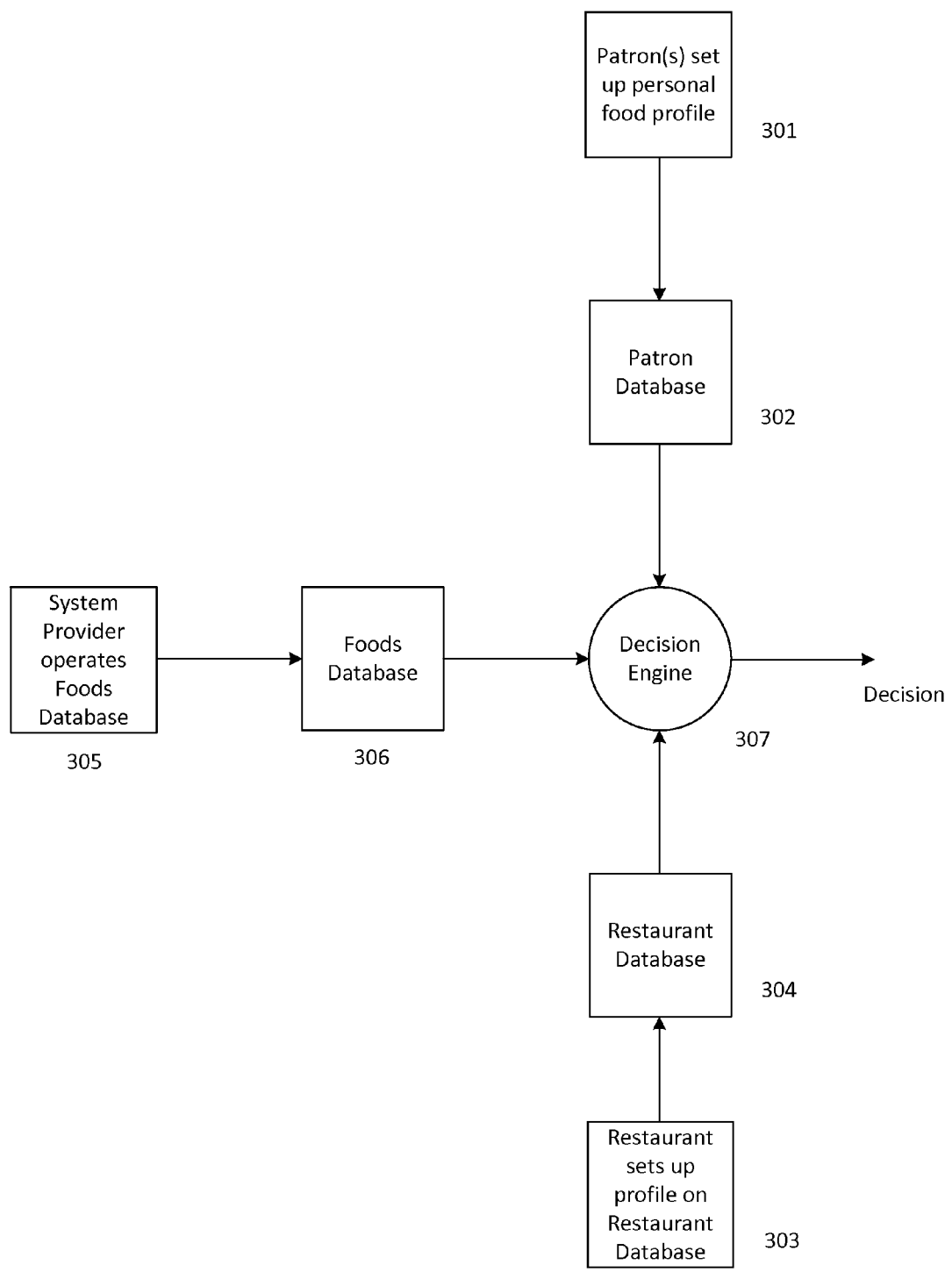
FIG. 3A is an alternate representation of a further aspect of the device of the present design.
Figure 3B:
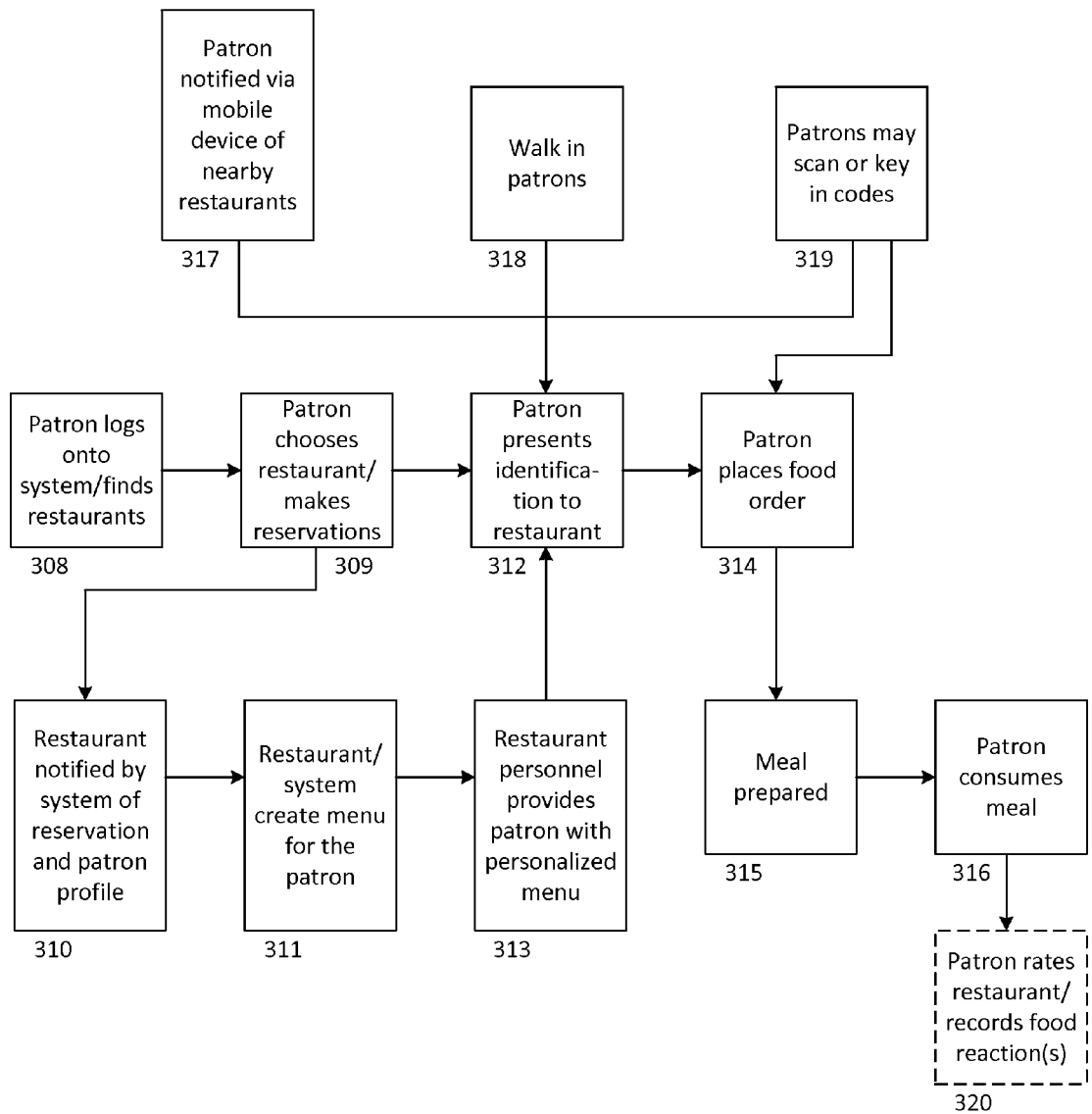
FIG. 3B shows an alternate aspect of the functionality associated with the present design.

An alternate embodiment/representation of the present design is presented in FIGS. 3A and 3B. From FIG. 3A, point 301 indicates the patron sets up a personal food profile. The patron profile may be maintained on any type of device, including the patron's device (PC, handset, etc.) but also on a central server or server arrangement, the Internet "cloud," or on any type of device. Point 202 shows a patron database holding data from a variety of patrons. Again, this patron database may be provided and maintained on a single device or distributed over multiple devices, and is similar to the patron registry 102 illustrated in FIG. 1. At point 303, a restaurant may set up a profile on a restaurant database, which may be provided and maintained on a single device or distributed over multiple devices. Point 304 shows the restaurant database. At point 305, the system provider operates a foods database, which may include various foods or products known to be preferred or not preferred by individuals, as well as foods that contribute to specific sensitivities. Further, the foods database may include foods that can be combined as well as foods that cannot be combined. Decision engine 307 then takes information from patron database 302, restaurant database 304, and foods database 306 and compares desires and sensitivities expressed by the patron, available dishes identified by the restaurant, and compares known food combinations with these factors and determines a potential set of dishes that can be provided to the patron. Again, the decision may be reviewed or influenced by the restaurant—one restaurant chef may believe peanut oil can be replaced with olive oil under a set of circumstances, where another restaurant chef may believe such a substitution would never be appropriate.

FIG. 3B illustrates an alternate representation of the present design. In FIG. 3B, point 308 indicates patrons or patrons may log onto a web site and may find appropriate restaurants (geographic, food type, reviews, etc.). At point 309, the patron may choose a restaurant and may make a reservation. Point 310 indicates the restaurant is notified by the system of a restaurant and patron profiles. As may be appreciated, more than one in a party may have preferences and/or sensitivities indicated and be a participant, and a menu for each participating patron may be prepared and presented to the appropriate patron. Alternately, the restaurant may simply consider all participants and alter the menu for all participants, possibly determining specific menus for each individual participant. Thus both individuals and groups can be addressed using decision engine 307, as shown by point 311, wherein the restaurant or the system may create individualized or specific menus for patrons. In one circumstance, a participant may arrive at a restaurant, present her identification as a participant in the program, the decision engine may determine a menu for her, and the menu may be printed and presented to the patron in a relatively short amount of time. Additionally, as implied at point 311, the physical menu may be prepared at the direction of the system and provided to the restaurant, or the system may determine the menu for restaurant X and provide all information regarding the menu for an individual or group of individuals to restaurant X. Functionality related to and printing of menus may therefore occur in different locations.

Point 312 indicates the patron arrives at the restaurant and presents his identification. Alternately, point 312 may represent the patron indicating he is a participant in the program to the restaurant and making a reservation. In essence, the restaurant receives patron information and a seating reservation at point 312. At point 313, the restaurant servers may provide the patron with the custom menu, individualized for his sensitivities and/or preferences. At point 314, the patron places a food order, at point 315 the meal is prepared according to the selection of the patron. At point 316, the patron eats his dinner.

Point 317 represents certain added functionality, namely patrons being notified on a device of nearby participating restaurants, either on the fly (e.g. via a mobile device, smartphone, etc.) or via the internet (i.e., "I am at this location and wish to dine out on Thursday night—what participating restaurants are nearby?" or, "I will be in Cleveland on Tuesday the $23^{rd}$—what participating restaurants are in the Cleveland area?", etc.) Point 318 represents a walk-in patron, including both a participating patron and a non-participating patron. In the case of the participating patron, the functionality disclosed at point 310 may occur, the patron may be provided with an available menu, and/or the patron information may be provided and the decision engine 307 employed to decide on possible meals for the patron. For the non-participant walk-in, the system may do nothing and restaurant staff may provide a standard menu to the patron, or the non-participant walk in patron may be queried as to preferences and a personalized menu provided to him based on responses. Such queries may be simple, such as "Meat preference" or detailed, such as an extensive list of questions seeking all sensitivities and preferences appropriate for the restaurant on the day of the walk-in. Point 319 indicates patrons may scan or key in codes from the menu presented, and the selections electronically transmitted to the restaurant or one or more of the databases (patron database 302, restaurant database 304, and/or foods database 306). Point 320 indicates patrons may provide feedback or recommendations for the system and/or restaurant.

Thus in accordance with the present design, there is provided a method for providing food to a patron, such as a restaurant patron. The method includes providing, from a computing device, a set of food sensitivity and preference queries to the patron and receiving at the computing device a set of food sensitivity and preference query responses from the patron. When the patron displays an intent to patronize a participating restaurant, the method further includes employing the computing device to evaluate a current menu and possible alterations to the menu in view of the set of food sensitivity and preference query responses and determine a patron specific menu based on the current menu and possible alterations to the current menu and the set of food sensitivity and preference query responses, and providing the patron specific menu to the patron.

According to another embodiment, there is provided an apparatus for facilitating providing food to a patron, comprising a computing device. The computing device includes a patron database configured to receive and maintain at least one set of patron food sensitivity and preference query responses representing food sensitivities and preferences indicated by a restaurant patron, a restaurant database configured to maintain participating restaurant information, a foods database configured to maintain a series of foods compatible with patron sensitivities and preferences and a series of foods incompatible with patron sensitivities and preferences; and a decision engine configured to receive information from the patron database, restaurant database, and foods database and determine a patron specific menu based on at least one set of patron food preference query responses, participating restaurant information, and the series of foods compatible with patron sensitivities and preferences and the series of foods incompatible with patron sensitivities and preferences.

In accordance with a further embodiment, there is provided a method for providing food to a patron. The method includes receiving a set of food preference query responses from the patron, employing the computing device to evaluate a proposed target restaurant set of current menu dish offerings and offerings that can be specially created for the patron in view of the set of food sensitivity and preference query responses and determine a patron specific menu based on the proposed target restaurant set of dish offerings and the set of food sensitivity and preference query responses, and providing the patron specific menu to the patron based on the evaluation and determination.

The foregoing description of specific embodiments reveals the general nature of the disclosure sufficiently that others can, by applying current knowledge, readily modify and/or adapt the structure without departing from the general concept. Therefore, such adaptations and modifications are within the meaning and range of equivalents of the disclosed embodiments. The phraseology or terminology employed herein is for the purpose of description and not of limitation.

What is claimed is:

1. A method for providing food to a patron, comprising:
providing, from a computing device, a set of food sensitivity and preference queries to the patron;
receiving at the computing device a set of food sensitivity and preference query responses from the patron;
after receiving at the computing device the set of food sensitivity and preference query responses from the patron, employing the computing device to evaluate a current menu of a participating restaurant and possible alterations to the current menu of the participating restaurant in view of the set of food sensitivity and preference query responses from the patron and determine a patron specific menu for the participating restaurant based on the current menu for the participating restaurant, the possible alterations to the current menu, and the set of food sensitivity and preference query responses from the patron; and
providing the patron specific menu for the participating restaurant to the patron;
wherein determining the patron specific menu comprises removing at least one food item from the current menu of the participating restaurant, and wherein possible alterations to the current menu comprise changes to the current menu approved by personnel associated with the participating restaurant.

2. The method of claim 1, further comprising advising the patron of physically proximate participating restaurants to a patron specified geographic location.

3. The method of claim 1, further comprising printing the patron specific menu prior to providing the patron specific menu to the patron.

4. The method of claim 1, wherein the set of food sensitivity and preference queries include a food allergy query.

5. The method of claim 1, further comprising receiving a set of restaurant dish preferences at the computing device, wherein employing the computing device to evaluate the current menu of the participating restaurant and determine the patron specific menu for the participating restaurant comprise evaluating the current menu of the participating restaurant and determining the patron specific menu based on the set of restaurant dish preferences.

6. The method of claim 1, wherein the computing device receives and maintains the set of food preference query responses from the patron with a plurality of other patron food preference query responses.

7. An apparatus for facilitating providing food to a patron, comprising:
a computing device comprising:
a patron database configured to receive and maintain at least one set of patron food sensitivity and preference query responses representing food preferences indicated by a restaurant patron;
a current menu from a participating restaurant;
a foods database configured to maintain a series of foods compatible with patron sensitivities and preferences and a series of foods incompatible with patron sensitivities and preferences; and
a decision engine configured to receive information from the patron database, the current menu from the participating restaurant, and foods database and subsequently determine a patron specific menu for the participating restaurant based on the current menu for the participating restaurant, possible alterations to the current menu, and at least one set of patron food sensitivity and preference query responses, and the series of foods compatible with patron sensitivities and preferences and the series of foods incompatible with patron sensitivities and preferences;
wherein the decision engine is configured to determine the patron specific menu by removing at least one food item from the current menu of the participating restaurant, and wherein possible alterations to the current menu comprise changes to the current menu approved by personnel associated with the participating restaurant.

8. The apparatus of claim 7, further comprising a printing apparatus configured to print the patron specific menu for presentation to the patron.

9. The apparatus of claim 7, wherein the decision engine is configured to determine a plurality of patron specific menus each specifically determined for one of a plurality of patrons.

10. The apparatus of claim 7, wherein the decision engine is configured to determine a single patron specific menu specifically determined for a plurality of patrons.

11. The apparatus of claim 7, wherein the computing device comprises a plurality of hardware components.

12. The apparatus of claim 7, wherein the decision engine is configured to:
match patron food query responses with dishes offered by a restaurant;
rule out dishes offered by the restaurant wherein the patron has expressed an undesirable attribute to a dish component or a sensitivity to the dish component based on information in the foods database;
wherein the foods database includes alternative dish preparation possibilities.

13. The apparatus of claim 7, wherein the restaurant database comprises a plurality of entries corresponding to dishes offered by participating restaurants and components of the dishes offered.

14. The apparatus of claim 7, wherein the apparatus enables the patron to make a reservation at a restaurant, and once the reservation is made, the decision engine receives information from the patron database, restaurant database, and foods database and determines the patron specific menu.

15. A method for providing food to a patron, comprising:
receiving a set of food sensitivity and preference query responses from the patron;
after receiving the set of food sensitivity and preference query responses from the patron, employing a computing device to:
evaluate a proposed target restaurant set of dish offerings in view of the set of food sensitivity and preference query responses; and
determine a patron specific menu for the proposed target restaurant based on the proposed target restaurant set of dish offerings, possible alterations to the proposed target restaurant set of dish offerings, and the set of food sensitivity and preference query responses; and
providing the patron specific menu for the proposed target restaurant to the patron based on the evaluation and determination;
wherein the computing devices determines the patron specific menu for the proposed target restaurant by removing at least one food item from the proposed target restaurant set of dish offerings based on the set of food sensitivity and preference query responses and the possible alterations to the proposed target restaurant set of dish offerings, wherein possible alterations to the proposed target restaurant set of dish offerings comprise changes to the proposed target restaurant set of dish offerings approved by personnel associated with the proposed target restaurant.

16. The method of claim 15, further comprising advising the patron of physically proximate participating restaurants to a patron specified geographic location.

17. The method of claim 15, wherein the food sensitivity and preference queries comprise a taste preference query, an ingredients preference query, a place of origin preference query, a method of production preference query, a method of preparation preference query, a carbon-footprint query, and a food allergy query.

18. The method of claim 15, further comprising receiving a set of restaurant dish preferences at the computing device, wherein employing the computing device to evaluate and determine are further based on the set of restaurant dish preferences.

19. The method of claim 15, wherein the computing device receives and maintains the set of food sensitivity and preference query responses from the patron with a plurality of other patron food preference query responses.

20. The method of claim 15, wherein the food is provided to the patron at a participating restaurant, wherein the participating restaurant is an establishment that serves food to patrons.

* * * * *